United States Patent
Chaiko et al.

(10) Patent No.: US 7,163,972 B2
(45) Date of Patent: Jan. 16, 2007

(54) PREPARATION OF A CONCENTRATED ORGANOPHYLLOSILICATE AND NANOCOMPOSITE COMPOSITION

(75) Inventors: David J. Chaiko, Naperville, IL (US); Suhas G. Niyogi, Woodridge, IL (US)

(73) Assignee: UChicago Argonne, LLC, Chicago, IL (US)

( * ) Notice: Subject to any disclaimer, the term of this patent is extended or adjusted under 35 U.S.C. 154(b) by 129 days.

(21) Appl. No.: 10/428,348

(22) Filed: May 2, 2003

(65) Prior Publication Data

US 2004/0220305 A1    Nov. 4, 2004

(51) Int. Cl.
  *C08K 9/06*   (2006.01)
  *C08K 3/34*   (2006.01)
  *C08K 5/01*   (2006.01)
  *C08L 91/06*  (2006.01)

(52) U.S. Cl. ............ 523/216; 524/275; 524/276; 524/277; 524/445; 524/446; 524/474; 524/475; 524/487; 524/488; 524/489; 524/490

(58) Field of Classification Search ............... 523/216; 524/789, 791, 445, 277, 446
See application file for complete search history.

(56) References Cited

U.S. PATENT DOCUMENTS

| | | | |
|---|---|---|---|
| 3,977,894 A | | 8/1976 | White |
| 4,235,751 A | * | 11/1980 | Del Pesco ............... 502/62 |
| 4,810,734 A | * | 3/1989 | Kawasumi et al. ...... 523/216 |
| 4,816,517 A | | 3/1989 | Wilkus et al. |
| 4,889,885 A | * | 12/1989 | Usuki et al. ............. 524/445 |
| 5,837,763 A | | 11/1998 | Ferraro et al. |
| 6,033,736 A | | 3/2000 | Perlman et al. |
| 6,262,162 B1 | * | 7/2001 | Lan et al. ............... 524/445 |
| 6,271,298 B1 | | 8/2001 | Powell |
| 6,407,155 B1 | | 6/2002 | Qian et al. |
| 6,759,463 B1 | * | 7/2004 | Lorah et al. ............. 524/445 |
| 6,790,896 B1 | | 9/2004 | Chaiko |
| 6,822,035 B1 | | 11/2004 | Chaiko |
| 6,841,226 B1 | | 1/2005 | Dontula et al. |
| 6,864,308 B1 | | 3/2005 | Rosenthal et al. |

OTHER PUBLICATIONS

Beall, et al., "Nanocomposites Produced Utilizing A Novel Ion-Dipole Clay Surface Modification", Chemistry and Technology of Polymer Additives, 1999, pp. 266-280.*

* cited by examiner

*Primary Examiner*—Vasu Jagannathan
*Assistant Examiner*—Vickey Ronesi
(74) *Attorney, Agent, or Firm*—Foley & Lardner LLP

(57) ABSTRACT

The present invention provide methods for producing a low moisture organophyllosilicate composition using monomers, oligomers, or polymers to displace water associated with the organophyllosilicates in an aqueous organophyllosilicate slurry or filter cake. The invention additionally provides methods for producing organophyllosilicate nanocomposites from the concentrated organophyllosilicate compositions by dispersing the compositions in a polymer matrix.

11 Claims, 3 Drawing Sheets

PREPARATION OF A CONCENTRATED ORGANOPHYLLOSILICATE AND NANOCOMPOSITE COMPOSITION

STATEMENT REGARDING FEDERALLY SPONSORED RESEARCH

The invention was made with Government support under Contract No. W-31-109-ENG-38 awarded by the U.S. Department of Energy. The government has certain rights in the invention.

FIELD OF THE INVENTION

This invention relates primarily to methods for processing organophyllosilicate nanocomposites. More particularly, this invention relates to methods for increasing the efficiency of removing water from organophyllosilicate slurries and filter cakes using organic monomers, oligomers, and polymers.

BACKGROUND OF THE INVENTION

Much interest has been created by the recent advances in the production of nanocomposites, nanometer sized dispersions of organophilic clays in polymers that form polymeric hybrids. Nanocomposites have been demonstrated to produce dramatic improvements in mechanical properties, heat resistance, thermal stability, and reduced gas permeability of the base polymer without loss of impact strength. Due to their enhanced barrier properties and clarity, nanocomposites are well suited for use as gas transport barriers in packaging applications. Examples include nylon-based nanocomposites for food and beverage packaging which incorporate the nanocomposite layer within single or multi-layer films. Reduction in gas diffusion is attributed to the presence of the clay particles which act to increase diffusion path length.

Typically, the organoclays used in nanocomposites are prepared by contacting an aqueous-based slurry of purified clay with various organic compounds, such as water-soluble polymers and surfactants. Present processing techniques require the organoclays to be recovered from the slurry and dried to a low moisture level before the organoclays may be processed further. Film drying and spray drying are the usual methods for attaining a low moisture level in the organoclays. However, the organoclays are very retentive of water and drying the organoclays to a moisture level suitable for further processing can be difficult, thermal energy intensive, time consuming, and expensive. In fact, the energy used to evaporate the large amounts of water associated with organoclay slurries and filter cakes accounts for approximately one third of the cost for making the organoclays that are used to produce nanocomposites by using conventional techniques.

Thus, a need exists for a method of preparing nanocomposites that eliminates or reduces the need for drying organoclays prior to their incorporation into a nanocomposite matrix.

SUMMARY OF THE INVENTION

One aspect of the present invention provides a method for producing a concentrated organophyllosilicate composition by combining an aqueous organophyllosilicate slurry or filter cake with a monomer, an oligomer, or a polymer capable of displacing water associated with the organophyllosilicate. In this method the monomer, oligomer, or polymer physically displaces water from clay agglomerates in the slurry or filter cake, thereby reducing the time and energy required to dry the organophyllosilicate before further processing.

One embodiment of the invention provides a method for producing a low-moisture, concentrated organophyllosilicate composition by mixing an organophyllosilicate filter cake or slurry with a monomer, an oligomer, or a polymer capable of displacing water molecules associated with the organophyllosilicate, followed by the step of removing at least a portion of the displaced water. This embodiment may provide a concentrated organophyllosilicate composition having a moisture content of less than about 10 weight percent, without employing conventional, energy intensive drying processes, such as film drying or spray drying. This includes embodiments wherein the resulting concentrated organophyllosilicate composition has a moisture content of less than about 5 weight percent, and further includes embodiments wherein the concentrated organophyllosilicate composition has a moisture content of less than about 1 weight percent. In this embodiment, the amount of monomer, oligomer or polymer added to the filter cake or slurry is sufficient to displace at least some water molecules from the phyllosilicate, thereby reducing water retention by the organophyllosilicate and facilitating the removal of water. Typically, a weight ratio of phyllosilicate to monomer, oligomer, or polymer of from about 1:99 to about 95:1 will be sufficient for this purpose. This includes embodiments where the weight ratio of phyllosilicate to monomer, oligomer, or polymer is from about 90:10 to about 25:75 and further includes embodiments where the weight ratio of phyllosilicate to monomer, oligomer, or polymer is from about 75:25 to about 40:60. The monomer, oligomer, or polymer may be added as a liquid and may be mixed together with the organophyllosilicate slurry or filter cake in a mill or extruder.

The methods of this invention may employ any monomer, oligomer, or polymer capable of displacing water associated with an organoclay. One class of suitable oligomers is hydrophobic oligomers. In one embodiment, the oligomer is a polyolefin resin. In another embodiment, the oligomer is a wax. In still another embodiment the oligomer is an oil. In various preferred embodiments the oligomer has a melting point between about 10° C. and about 160° C. Non-limiting examples of suitable monomers include styrene monomers, acrylate monomers, such as methyl methacrylate, acetate monomers, such as vinyl acetate, acrylonitrile monomers, butadiene monomers, and mixtures thereof.

When the monomers used in the drying step are polymerizable, the monomers may be polymerized in the presence of the organophyllosilicate after the initial drying takes place. Similarly, when the oligomers used in the drying step are crosslinkable, the oligomers may be crosslinked in the presence of the organophyllosilicate after the initial drying step.

A second aspect of the invention provides a method for producing an organophyllosilicate nanocomposite by dispersing one of the above-described concentrated organophyllosilicate compositions in a polymer matrix.

DETAILED DESCRIPTION OF THE INVENTION

Figure 1:
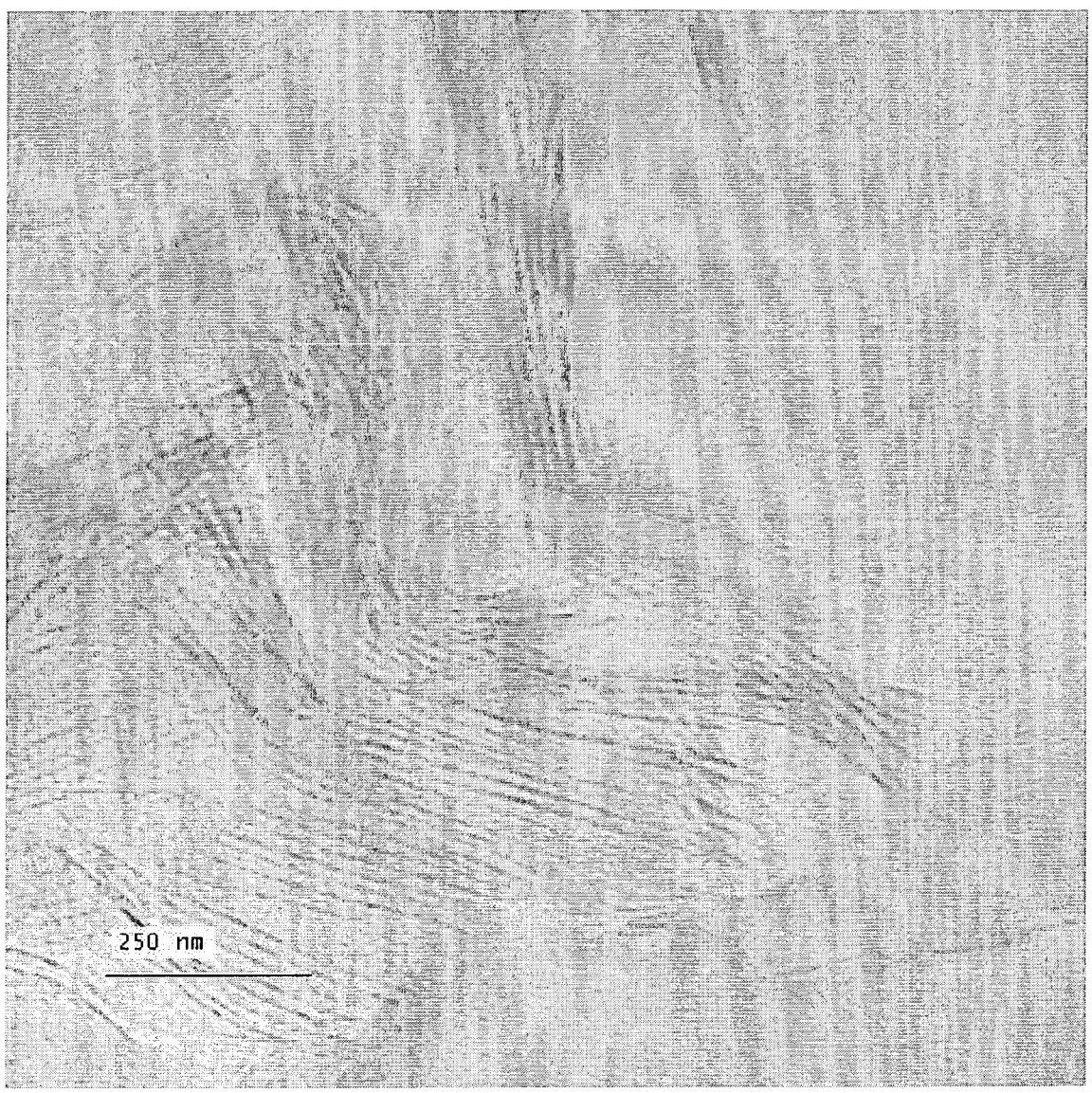
FIG. 1 is a transmission electron micrograph of a polystyrene nanocomposite prepared according to Example 1.

This invention is based on the use of monomers, oligomers and polymers in association with organophyllosilicates to facilitate the efficient incorporation of the organophyllosilicates into polymer nanocomposites without the need for energy intensive and expensive drying steps.

As will be understood by one skilled in the art, the phyllosilicates discussed herein inherently have basal surfaces and are arranged in layers of particles which are stacked on top of one another. The stacking of the phyllosilicate particles provides interlayers, or galleries, between the phyllosilicate layers. These galleries are normally occupied by cations, typically comprising sodium, potassium, calcium and magnesium ions or combinations thereof. Water is also present in the galleries, and tends to associate with the cations.

Organophyllosilicates are phyllosilicates, e.g. clays, which have had their basal surfaces modified with organic surfactants so that the clay is more easily dispersed through exfoliation of the individual clay platelets in aqueous or organic mixtures.

Organophyllosilicates suitable for use in the methods of the present invention are well known in the art. Traditionally, hydrophobic organoclays have been prepared from a smectite-clay by surface exchange with high-molecular-weight quaternary amines, such as dimethyl dihydrogenated tallow ammonium chloride, dimethyl benzyl hydrogenated tallow ammonium chloride and methyl benzyl dihydrogenated tallow ammonium chloride. Another variation described in the literature for making organoclays involves preparation of a hydrophobic organoclay by onium ion exchange followed by intercalation of a hydrophilic or hydrophobic polymer melt. Other suitable organoclays are described in U.S. Pat. Nos. 6,822,035 and 6,790,896, the entire disclosures of which are incorporated herein by reference.

Although any phyllosilicate is suitable for use in the present invention, preferred phyllosilicates are the smectite clay minerals such as montmorillonite, hectorite, saponite, beidellite, stevensite, and nontronite. Also included are synthetic smectite clays such as the commercially available Laponite®. Talcs, natural and synthetic micas, and hydrotalcites are also useful in the nanocomposites produced according to the present invention.

For the purposes of this disclosure, the term "aqueous organophyllosilicate slurry" simply means an aqueous suspension of organophyllosilicate particles having a relatively low organophyllosilicate particle concentration. The concentration of organophyllosilicate in an organophyllosilicate slurry may vary over a broad range, but is characterized in that it is too low to allow the organophyllosilicate to be incorporated easily into a polymer nanocomposite without at least some drying. In various embodiments of this invention, an organophyllosilicate slurry is one having an organophyllosilicate concentration of less than about 60 weight percent. This includes slurries having organophyllosilicate concentrations of less that about 40 weight percent and further includes slurries having organophyllosilicate concentrations of less than about 20 weight percent.

For the purposes of this disclosure, an "organophyllosilicate filter cake" is a compacted solid or semisolid organophyllosilicate material separated from an aqueous organophyllosilicate slurry and remaining on a filter after pressure filtration. Although some of the water has been removed from the slurry to form a filter cake, it is generally desirable to remove at least some of the remaining water prior to the incorporation of the organophyllosilicate into a nanocomposite.

One aspect of the invention uses a flushing operation to produce a low moisture organophyllosilicate composition having a high organophyllosilicate concentration without the need for energy intensive drying operations, such as film drying or spray drying. In these methods, one or more monomers, oligomers, or polymers which may be hydrophobic, are mixed with an aqueous organophyllosilicate slurry or filter cake where they wet the surface of the organophyllosilicates, thereby releasing physically trapped water from the surface of the organophyllosilicate particles. The water displaced from the phyllosilicates forms a separate phase which is easily separated from the organophyllosilicates as steam or liquid which saves energy and produces a concentrated organophyllosilicate composition that is readily dispersed in a polymer to form a nanocomposite. In some embodiments, the concentrated organophyllosilicate compositions have an organophyllosilicate concentration of at least about 50 weight percent. This includes embodiments where the concentrated organophyllosilicate composition has an organophyllosilicate concentration of at least about 60 weight percent and further includes embodiments where the concentrated organophyllosilicate composition has an organophyllosilicate concentration of at least about 70 weight percent. In terms of water content, preferred concentrated organophyllosilicate compositions will have a water content of less that about 10 weight percent. This includes embodiments where the water content of the concentrated organophyllosilicate composition has a water content of less than about 50 weight percent and further includes embodiments where the water content of the concentrated organophyllosilicate composition has a water content of less than about 10 weight percent.

The water displaced from the organophyllosilicate may take the form of a liquid or a gas depending on the temperature at which the mixing takes place and whether the mixing is done in an open or a closed system. The displaced water may be removed by any conventional means known in the art. For example, the water may be physically separated by simply decanting the water away. Alternatively, the water may be evaporated off by applying heat with mixing or by exposing the mixture to vacuum. When polymerizable monomers are used in the drying step, the monomers may be polymerized in the presence of the organophyllosilicate after the displaced water has been removed to produce a nanocomposite. Polymerization may take place after additional monomer has been added to the system. Similarly, when crosslinkable oligomers are used in the drying step, the oligomers may be crosslinked in the presence of the organophyllosilicate after the displaced water has been removed to produce a nanocomposite. Again, crosslinking may take place after additional oligomer has been added to the system. In order to facilitate the polymerization or crosslinking process various polymerization and crosslinking initiators may be added to the mixture. The precise nature of the polymerization and crosslinking initiators will depend on the monomers and oligomers employed, however, many suitable initiators are well-known and commercially available.

The oligomers for use with the present invention preferably have melting points from about 10° C. to about 160° C. This includes embodiments where the oligomers have melting points from about 30° C. to about 120° C. and further includes embodiments where the oligomers have melting points from about 40° C. to about 100° C. In various embodiments the oligomers have an average molecular weight of no more than 20,000. This includes embodiments where the oligomers have an average molecular weight of no more than 10,000 and further includes embodiments where the oligomers have an average molecular weight of no more than 5,000. The oligomer may be a resin, a wax, or an oil. In various embodiments the oligomer is a polyolefin. Examples of suitable waxes for use with the methods of the present invention include paraffin waxes, microcrystalline montan waxes, vegetable waxes, Fisher-Tropsch waxes, polypropylene waxes, polyethylene waxes, polyethylene glycol waxes, or combinations thereof. Paraffin waxes, preferably having melting points between about 25° C. and about 100° C., are particularly suited for use with the methods of the present invention. Polypropylene waxes and polypropylene oils are also particularly suited for use with the methods of the present invention. Polypropylene resins having a high melt index and capable of being vis-broken to produce a low viscosity material at temperatures below about 175° C. and preferably below about 150° C., are particularly well-suited oligomers for use with the invention.

The monomers, oligomers, or polymers may be mixed in liquid form with the aqueous organophyllosilicate slurry or filter cake by any suitable means known in the art. In one embodiment, the monomers, oligomers, or polymers are mixed with an organophyllosilicate slurry or filter cake by co-feeding the monomers, oligomers, or polymers and the filter cake or slurry into a mill, such as a pug mill, or an extruder. In one variation of this embodiment, the mill or the extruder is operated at a temperature of about 100° C. or greater, preferably between about 100° C. and about 130° C., and the water is removed in the form of water vapor by applying a vacuum to the system.

In one embodiment of the invention, a polypropylene wax is prepared directly in the barrel of an extruder by reacting polypropylene with an organic peroxide whereby polypropylene chains are broken to provide lower molecular weight or higher melt index materials. An organophyllosilicate filter cake is then added to the extruder at a point in the process where the reaction has come to completion.

The present invention also provides organophyllosilicate nanocomposites made with the above-described concentrated organophyllosilicate compositions. These nanocomposites are made by dispersing the concentrated organophyllosilicate compositions in a polymer matrix to create a composite material. Because the individual platelets of phyllosilicates have a thickness in the nanometer range, composites of these platelets dispersed in other materials, such as polyolefins, are referred to as nanocomposites. As the phyllosilicate platelets dispersed throughout a polyolefin matrix are typically smaller than the wavelength of visible light, the optical characteristics of the polyolefin nanocomposites are almost completely unaffected. However, nanocomposites may provide superior ultraviolet protection and improved resistance to the degradative effects of ultraviolet radiation because the individual phyllosilicate platelets are the appropriate size to scatter and absorb the shorter wavelength ultraviolet radiation. It should be noted that although most desirably the phyllosilicates of the present invention are completely exfoliated, wherein individual platelets are dispersed evenly throughout the polymer matrix, and no agglomeration exists, the term nanocomposite, as used herein, also encompasses compositions where the phyllosilicate is substantially homogeneously dispersed throughout the polyolefin polymer. Although the phrase "substantially homogeneously dispersed" does not lend itself to an exact definition, a person skilled in the art will understand that all dispersions of phyllosilicate platelets which exhibit nanocomposite properties are meant to be included in the present invention.

The polymer nanocomposites made according to the present invention are suitable for use in a vast array of commercial products, particularly where these polymers are already in use. These products include packaging materials, car body panels, car interior panels, thin films and the like.

The nanocomposites may be produced by dispersing the concentrated organophyllosilicate compositions in any thermoplastic or thermoset polymer which is capable of solvating the organophyllosilicates. This includes elastomers and nonpolar polymers, such as polyolefins. Methods for dispersing the concentrated organophyllosilicate compositions in polymer melts are well known in the art and include a variety of mixers and extruders. Typically the organophyllosilicate loading in the polymer will be between about 0.1 and about 10 weight percent.

Polymers in which the present organophyllosilicates can be dispersed include polyolefins, such as polyethylene, polypropylene, ethylene-propylene copolymers, ethylene-propylene-diene terpolymers, copolymers such as poly(ethylene-co-vinyl acetate), poly(ethylene-co-vinyl alcohol), poly(ethylene-co-vinyl acetate-co-methacrylic acid), poly(ethylene-co-methacrylate), poly(ethylene-co-methacrylic acid), poly(methyl methacrylate), and elastomers such as polyisobutylene, polyisoprene, polybutadiene, poly(styrene-butadiene-styrene), poly(styrene-co-acrylonitrile), poly(acrylonitrile-co-butadiene-co-styrene), polystyrene, polyvinylchloride, cellulose acetate, cellulose acetate butyrate, cellulose propionate and the like. The organophyllosilicates of the present invention may also be dispersed in a variety of monomers and mixtures of monomers including styrene, methyl methacrylate, isoprene, butadiene, vinyl acetate, acrylonitrile, methacrylonitrile, butylmethacrylate, 2-ethylhexylmethacrylate, vinyl pyridine, 1-vinyl-2-pyrrolidinone, acrylamide, and the like which may then be polymerized by appropriate methods known to those skilled in the art.

The following non-limiting examples serve to further illustrate the advantages of the disclosed invention.

EXAMPLE 1

This example illustrates the use of the invention to flush the water and salt from an organoclay filter cake using a styrene monomer. The organoclay concentrate is further diluted with additional monomer and polymerized to produce a nanocomposite.

The organoclay was prepared from a $Na^+$ montmorillonite (Cloisite Na, Southern Clay Products). The clay was dispersed in deionized water at a solids concentration of 2.5 weight percent (wt %). The edge of the clay platelets was rendered hydrophobic by reaction with the ammonium salt of 1-hydroxycocoyl-1,1-diphosphonate (Solutia). The amount of diphosphonate added was 3 wt % relative to the weight of the dry clay. The temperature of the clay slurry was then raised from room temperature to 70° C., after which the basal surfaces of the clay were modified by exchange with 110 milliequivalents (meq) of benzyldimethyl(hydrogenated tallow) ammonium chloride (Arquad DMHTB-75, Akzo Nobel) per 100 g clay. Combined with the quaternary amine was poly(ethylene glycol) at a concentration of 4 g per 100 g clay. The poly(ethylene glycol) aids in the solvation of the organoclay clay surface by increasing the basal spacing of the organoclay. It functions in a manner similar to that of the low-molecular-weight polar activators used to aid in the dispersion of organoclays in mineral oils during the preparation of high temperature greases. After addition of the quaternary amine to the clay slurry, the stirring was continued for one hour, the dispersion was then filtered and then washed with hot (70° C.) deionized water. The organoclay was recovered as a pressed filter cake with approximately 80 wt % water.

Water was removed from the filter cake by combining with enough styrene monomer to produce a 50:50 mixture of organoclay:styrene monomer. When the organoclay was combined with the monomer a majority of the water was flushed from the clay to produce a separate water phase that was decanted from the mixture. The temperature of the mixture was then raised to 100° C. to remove the remaining water by evaporation. The clay concentrate was then diluted with additional styrene monomer to produce a transparent clay dispersion containing 5 wt % organoclay.

The polymerization of the styrene was initiated by addition of 0.5 wt % benzoyl peroxide and heating to 120° C. The dispersion was left in the oven overnight in a sealed teflon container. Compression molded films of the nanocomposite were colorless and transparent. Microscopic examination of the films with polarized light showed no evidence of un-dispersed clay. Even though the polymerization reaction was carried out under quiescent conditions, transmission electron micrographs (e.g., see FIG. 1) of the nanocomposite showed that the basal spacing of the organoclay was increased from 19 Å to between 60- and 300-Å. This is a significantly higher basal spacing than what has been achieved with prior art (e.g., U.S. Pat. No. 6,252,020) which showed a maximum basal spacing of 35 Å.

EXAMPLE 2

This example illustrates the preparation of a polyurethane nanocomposite using the disclosed invention. The organoclay filter cake of Example 1 was combined with a commercially available polyol (Voranol 5287, Dow Chemical Company) to produce a final weight ratio of 50:50. The filter cake was combined with the polyol at room temperature, then heated to 70° C. As the water was flushed from the filter cake, it was decanted. When liquid water was no longer being generated, the temperature of the dispersion was raised to 100° C. and stirring continued for 20 min. The dispersion was then combined with additional polyol to bring the organoclay concentration to 3 wt %. Quite unexpectedly, the viscosity of the transparent dispersion was not noticeably higher than the neat polyol. This is in contrast to dispersions that were prepared by first drying the organoclay in an oven at 45° C. overnight. When the dried organoclay was dispersed in the polyol, the viscosity was significantly increased. In fact, the polyol was converted into a stiff gel that could not be poured or pumped.

Figure 2:
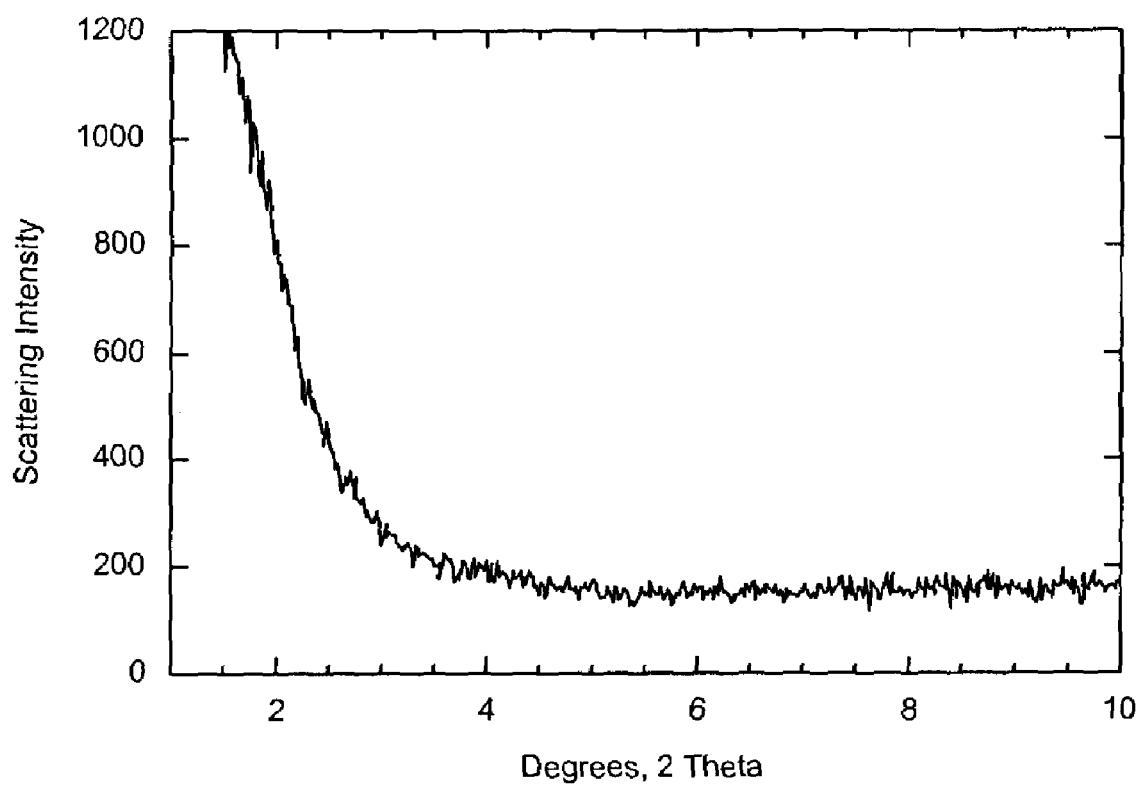
FIG. 2 is an x-ray diffraction pattern showing the lack of basal spacing in a clay/polyurethane nanocomposite prepared according to Example 2.

The polyol:clay dispersion was crosslinked with toluene diisocyanate by heating, under quiescent conditions, to 125° C. overnight in a nitrogen atmosphere. The x-ray diffraction pattern of the nanocomposite (see FIG. 2) no longer showed the basal reflection of the starting organoclay.

EXAMPLE 3

In this example the organoclay filter cake is flushed with a polyethylene wax to produce an organoclay concentrate that is capable of dispersion in polyethylene (e.g., linear low density polyethylene (LLDPE), low density polyethylene (LDPE), high density polyethylene (HDPE)) and ethylene propylene copolymers. The organoclay was prepared from a Na$^+$ montmorillonite (Cloisite Na, Southern Clay Products). The clay was dispersed in deionized water at a solids concentration of 2.5 wt %. The edge of the clay was rendered hydrophobic by reaction with the ammonium salt of 1-hydroxycocoyl-1,1-diphosphonate (Solutia). The amount of diphosphonate added was 0.5 wt % relative to the weight of the dry clay. The temperature of the clay dispersion was then raised to 70° C., after which the basal surfaces of the clay platelets were modified by exchange with 90 meq of dimethyl dihydrogented tallow ammonium chloride (Arquad 2HT-75, Akzo Nobel) per 100 g clay. Combined with the quaternary amine was 2000 ppm Irganox B225 (Ciba) relative to the weight of the clay. The antioxidant (Irganox B225) is used to inhibit free radical damage to the organoclay during compounding in polyolefins. After completion of the amine exchange, the organoclay slurry was filtered, redispersed in deionized water (70° C.) and pressure filtered to produce a filter cake containing 35 wt % solids. The remaining water plus salts were removed by flushing with polyethylene-block-poly(ethylene glycol) (HLB4, Aldrich). The flushing was carried out using a twin-screw extruder with an L/D of 52 (NFM Welding Engineers). The filter cake, combined with sufficient copolymer to produce a 50:50 mixture, was fed into the extruder in which the feed zone of the barrel was set to a temperature of 100° C. All other zones were held at a temperature of 130° C. There are a total of six heating zones in the extruder. A vacuum port located at zone 5 was used to remove the last traces of water vapor from the organoclay concentrate. The vacuum line was connected to a cold trap to further reduce the residual water in the organoclay product. The extruder was modified by removing the gland which seals the barrel from the drive shaft. During the flushing operation the water flowed countercurrent to the organoclay+copolymer and was collected from the barrel through the opening created by removal of the gland.

The organoclay concentrate was combined with LDPE by compounding in a Brabender Plasticorder at 130° C. and 100 rpm for 20 min. The concentration of the organoclay in the final product was 8 wt %. The product was a light green, transparent nanocomposite.

Transparent, colorless films approximately 5 mils thick were prepared by compression molding at 130° C. The oxygen transmission rate (OTR), at zero percent humidity, was measured at 30° C. Oxygen permeability was calculated from the measured OTR and film thickness and compared with values measured from reference LDPE films containing no added organoclay. The permeability of the nanocomposite was reduced 14× relative to the reference film.

EXAMPLE 4

In this example the organoclay filter cake is flushed with a polyethylene wax to produce an organoclay concentrate that is capable of dispersion in polyethylene (e.g., LLDPE, LDPE, HDPE) and ethylene propylene copolymers. The organoclay was prepared from a Na$^+$ montmorillonite (Cloisite Na, Southern Clay Products). The clay was dispersed in deionized water at a solids concentration of 2.5 wt %. The edge of the clay was rendered hydrophobic by reaction with the ammonium salt of 1-hydroxycocoyl-1,1-diphosphonate (Solutia). The amount of diphosphonate added was 3 wt % relative to the weight of the dry clay. The temperature of the clay dispersion was then raised to 70° C., after which the basal surfaces of the clay platelets were modified by exchange with 110 meq of dimethyl dihydrogented tallow ammonium chloride (Arquad 2HT-75, Akzo Nobel) per 100 g clay. Combined with the quaternary amine was 4 wt %, relative to the weight of the dry clay, poly (propylene glycol), molecular weight 1000, and 2000 ppm Irganox B225 (Ciba) relative to the weight of the clay. The antioxidant (Irganox B225) is used to inhibit free radical damage to the organoclay during compounding in polyolefins. After completion of the amine exchange, the organoclay slurry was filtered, redispersed in deionized water at 70° C. and pressure filtered to produce a filter cake containing 35 wt % solids. The remaining water plus salts were removed by flushing with paraffin wax (melting point 55–60° C., Aldrich). The flushing was carried out using a twin-screw extruder with an L/D of 52 (NFM Welding Engineers). The filter cake, combined with sufficient wax to produce a 75:25 mixture, was fed into the extruder in which the feed zone of the barrel was set to a temperature of 70° C. All other zones were held at a temperature of 100° C. There are a total of six heating zones in the extruder. A vacuum port located at zone 5 was used to remove the last traces of water vapor from the organoclay concentrate. The vacuum line was connected to a cold trap to further reduce the residual water in the organoclay product. The extruder was modified by removing the gland which seals the barrel from the drive shaft. During the flushing operation the water released from the organoclay flowed countercurrent to the organoclay+wax and was collected from the barrel through the opening created by removal of the gland.

The organoclay concentrate was combined with LDPE by compounding in a twin-screw extruder at 130° C. and 150 rpm. The concentration of the organoclay in the final product was 4 wt %. The product was a light green, transparent nanocomposite.

Transparent, colorless films were prepared by compression molding at 130° C. Dynamic mechanical thermal analysis was performed on the pressed films to measure glass transition temperature (Tg) and mechanical properties. The Tg of the nanocomposite was 20.8° C. compared with −23.3° C. for the reference film. The values of the storage modulus for the nanocomposite and the reference film are listed in Table 1.

TABLE 1

Storage Modulus (KPSI) of LDPE nanocomposite and the LDPE reference

| Temp., ° C. | LDPE Reference | LDPE Nanocomposite |
|---|---|---|
| −75 | 302 | 338 |
| −50 | 242 | 277 |
| −25 | 148 | 180 |
| 0 | 50 | 73 |
| 25 | 17.8 | 26.7 |
| 50 | 0.9 | 0.9 |

EXAMPLE 5

This example illustrates the use of the present invention for preparing organoclay concentrates for use in polypropylene and polypropylene copolymers. The organoclay filter cake of Example 5 was flushed with a vis-broken polypropylene (v-PP). The melting point of the v-PP was measured by differential scanning calorimetry and found to be 140° C. The v-PP was prepared from PP having a melt flow index of 3.5 at 230° C. and 2.16 kg and a melting point of approximately 160° C. The v-PP was prepared by combining the PP with 7 wt % Irganox 101 (Akzo Nobel) and feeding into a twin-screw extruder at 50 rpm with the barrel temperature set at 170° C.

Figure 3:
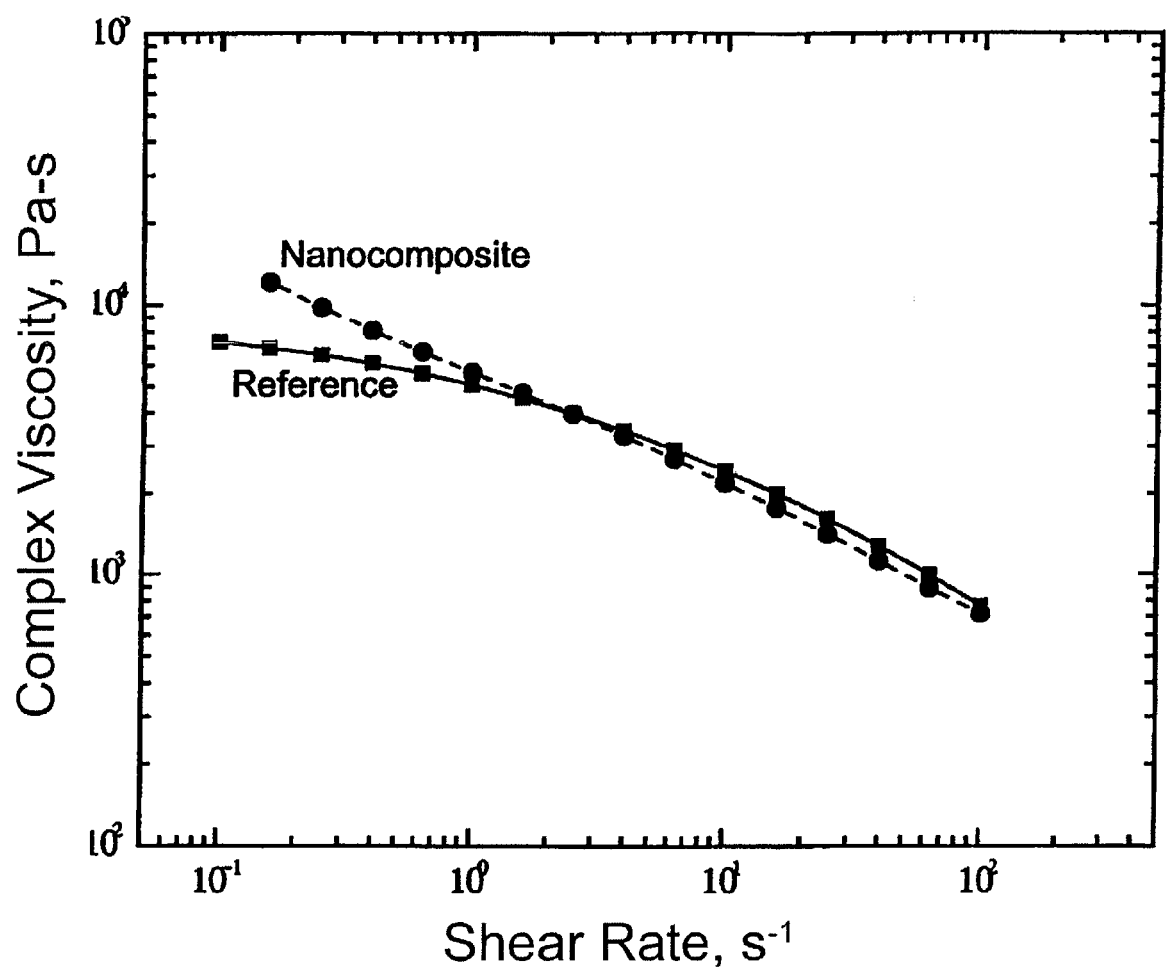
FIG. 3 is a plot of viscosity versus shear rate for a polypropylene nanocomposite and a polypropylene reference.

The filter cake was flushed with the v-PP under the same extruder conditions used in Example 4, except that the barrel temperature was set to 140° C. to accommodate the slightly higher melting temperature of the v-PP. As in Example 4, the feed zone was kept at 130° C. The final organoclay concentration in the v-PP concentrate was 75 wt %. The organoclay concentrate was then compounded with PP having a melt index of 3.5 to produce a nanocomposite containing 5 wt % organoclay. Measurements of Young's modulus, storage modulus, loss modulus, elongation at break, oxygen permeability, and glass transition temperature showed no detectable change from the reference polymer. However, the organoclay has a profound effect on melt viscosity. The viscosity at low shear is significantly increased relative to the pure polymer (see FIG. 3), making the nanocomposite ideally suited to use in thermoforming applications.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above.

While preferred embodiments have been illustrated and described, it should be understood that changes and modifications can be made therein in accordance with ordinary skill in the art without departing from the invention in its broader aspects as defined in the following claims.

What is claimed is:

1. A method for producing a concentrated organophyllosilicate composition comprising:
    (a) mixing an aqueous slurry or filter cake comprising an organophyllosilicate having water molecules associated therewith with an oligomer capable of displacing the water molecules to separate at least a portion of the water from the organophyllosilicate, wherein the oligomer is selected from the group consisting of paraffin waxes, microcrystalline montan waxes, vegetable waxes, Fisher-Tropsch waxes, polypropylene waxes, polyethylene waxes, polyethylene glycol waxes, and combinations thereof, and the oligomer has a melting point of from about 10° C. to about 160° C.; and
    (b) removing at least a portion of the displaced water as a liquid from the slurry or filter cake to form a concentrated organophyllosilicate composition.

2. The method of claim 1, wherein the oligomer has a molecular weight of no more than 20,000.

3. The method of claim 1, wherein the oligomer is selected from the group consisting of polypropylene waxes, polyethylene waxes, polyethylene glycol waxes, and combinations thereof.

4. The method of claim 1, wherein the weight ratio of the organophyllosilicate to the oligomer is from about 90:10 to about 25:75.

5. The method of claim 1, wherein the weight ratio of the organophyllosilicate to the oligomer is from about 75:25 to about 40:60.

6. The method of claim 1, wherein the concentrated organophyllosilicate composition comprises no more than about 10 weight percent water.

7. The method of claim 1, wherein the concentrated organophyllosilicate composition is produced without film drying or spray drying.

8. The method of claim 1, further comprising dispersing the concentrated organophyllosilicate composition in a polymer to form an organophyllosilicate nanocomposite.

9. The method of claim 1, further comprising crosslinking the oligomer in the presence of the concentrated organophyllosilicate composition to form an organophyllosilicate nanocomposite.

10. The method of claim 9 further comprising diluting the concentrated organophyllosilicate composition with additional oligomer, crosslinkable polymers, or mixtures thereof prior to crosslinking.

11. The method of claim 1, further comprising heating the concentrated organophyllosilicate composition to a temperature sufficient to evaporate off at least a portion of the displaced water.

* * * * *